United States Patent
Schmidt

[15] 3,651,505
[45] Mar. 21, 1972

[54] CAPACITIVE DISTANCE MEASURING

[72] Inventor: Claus Schmidt, Sandweier near Baden-Baden, Germany

[73] Assignee: Margit Schmall nee Mutscher, Baden-Baden, Germany

[22] Filed: Feb. 20, 1970

[21] Appl. No.: 13,139

[30] Foreign Application Priority Data

Mar. 24, 1969 Germany ............... P 19 14 876.6

[52] U.S. Cl. ............... 340/200, 324/61 R, 340/181, 340/267, 331/65
[51] Int. Cl. ............... G08c 19/16
[58] Field of Search ............... 340/200, 181, 267, 282, 265; 331/65; 318/662; 324/61 R, 61 P, 61

[56] References Cited

UNITED STATES PATENTS

| | | | |
|---|---|---|---|
| 3,320,548 | 5/1967 | Waard | 331/65 |
| 3,550,107 | 12/1970 | Thompson et al. | 324/61 R |
| 3,350,660 | 10/1967 | Engdahl et al. | 331/65 |
| 2,405,526 | 8/1946 | Sinnett | 331/181 |

Primary Examiner—John W. Caldwell
Assistant Examiner—Robert J. Mooney
Attorney—Ernest F. Marmorek

[57] ABSTRACT

The measuring device comprises a feeling electrode disposed above a conductive working piece surface the distance of which is to be measured. An oscillator is controlled by a series tank circuit that comprises a series connected feeling electrode and an inductance and, in addition, a separating condenser having substantially greater capacity than that of the measuring capacitor formed by the feeling electrode and the working piece surface. A first selective amplifier is tuned to amplify only the measuring frequency that results during the normal measuring conditions. A second selective amplifier is connected to the output of the oscillator parallel to the first amplifier, and it is tuned to amplify the low frequency that will be generated if the measuring capacitor is short-circuited.

6 Claims, 1 Drawing Figure

PATENTED MAR 21 1972 3,651,505
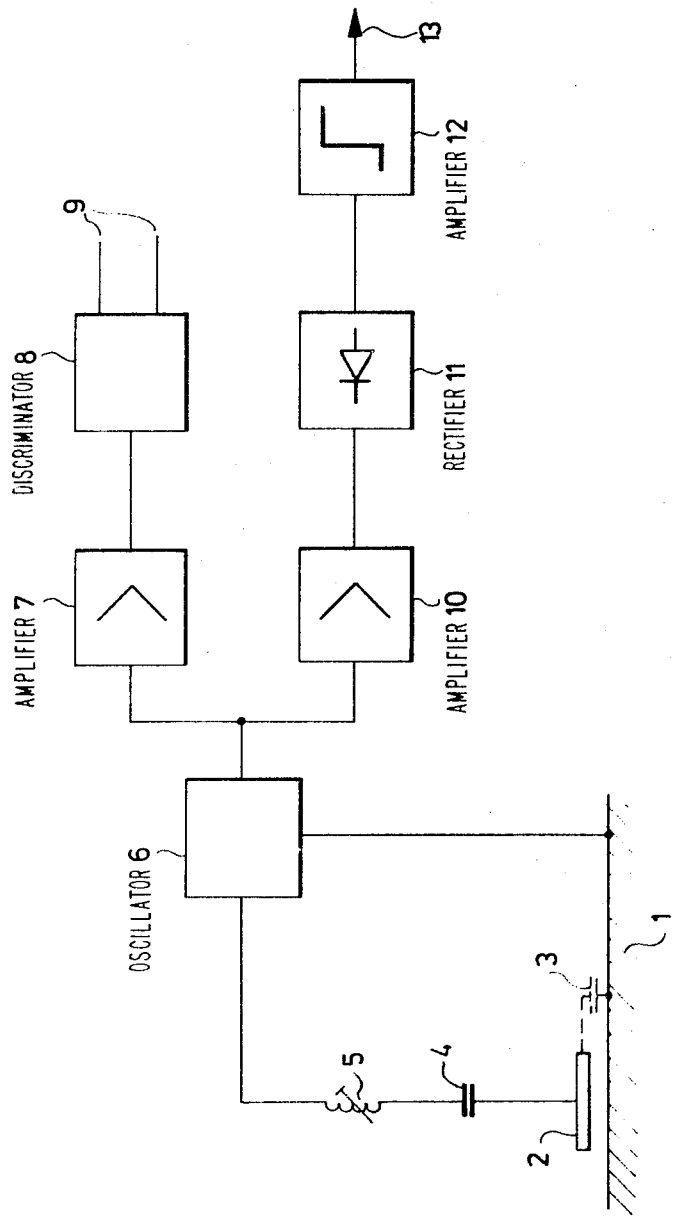
INVENTOR.
Claus Schmidt
BY
Ernst Marmorel,
His Attorney.

CAPACITIVE DISTANCE MEASURING

The present invention relates to a capacitive distance measurement.

In particular, the invention relates to a capacitive distance measuring device having a measuring condenser formed by a feeling electrode disposed above a conductive surface of the working piece the distance of which is to be measured. The capacity change is subsequently transduced by means of a transducer into proportional output signals.

Conventional capacitive distance measuring devices of this type are employed as feelers in controlling or regulating systems, for example, especially when due to unfavorable environmental conditions like excessive temperature, dusty atmosphere, wear of the equipment resulting from too frequent peak loads, etc., conventional mechanical or pneumatic feelers are inapplicable.

In those known devices the variable capacity of the measuring condenser electrode is transformed into a proportional signal. If a short circuit occurs between the feeling electrode and the conductive working piece surface, serious troubles will result in the prior art measuring circuits. Such a short circuit may be caused, for instance, by metal boring or turning chips on the working piece surface and due to the resulting galvanic connection there may be seriously damaged not only the distance measuring device itself but also the processed working piece, especially in automatic machining operations where the control is dependent on the sensing device. When the function of the feeling electrode is impeded, no measuring signal is generated and, consequently, a defective machining operation takes place. In the most cases the working piece cannot be removed in time from such a defective operational process.

SUMMARY OF THE INVENTION

It is accordingly one of the objects of the invention to provide a capacitive, distance measuring device which will avoid the above drawbacks of the prior art.

In particular, it is an object of this invention to provide a capacitive distance measuring device which will not be damaged or destroyed when an accidental short circuit in the measuring condenser occurs.

Another object of this invention is to provide means which prevents damage to the workpiece in case of a misfunction of the feeling electrode of the distance measuring device.

According to this invention, the above objects are attained by providing blocking impedance means between the feeling electrode of the measuring condenser and the series tank circuit of the measuring transducer and by dimensioning the blocking impedance means in such a manner as to insure during the absence of the short circuit a normal distance measuring function within a predetermined measuring range. In case of a short circuit between the feeling electrode and the conductive working piece surface, however, the blocking impedance means makes the transducer generate an output control or warning signal the frequency of which is out of the range of the normal distance measuring frequency. Moreover, the blocking impedance means takes during the short circuit and extremely high value for the direct current, thereby preventing the measuring device from damage. In a preferred embodiment, the blocking impedance is represented by a blocking capacitor; it may be substituted, however, by other passive or active electrical structural elements.

In the most simple and economic embodiment of this invention, the output of the measuring transducer is parallel connected to a distance indicating circuit on the one hand and to a selective warning circuit that is responsive to the low frequency warning signal only. In this preferred embodiment, the transducer is formed by an oscillator controlled by a series tank circuit which includes the feeling electrode - working piece surface measuring condenser as the proper measuring element. This series tank circuit determines the frequency of the oscillator, according to the measured distance. In addition, the series connection of the separating or blocking impedance means in the series tank circuit of the oscillator brings about the possibility of producing an alternative output signal of a considerably lower frequency that can be processed on a different path than the measuring frequency. At the same time, the blocking impedance galvanically separates the short circuited electrode from the input of the oscillator and the power supply thereof.

To improve operational security and to reduce costs of attendance, the second output signal is employed for the release of an acoustical or optical warning signal. In an automatic maching operation, however, the warning signal is utilized for controlling the operation or position of the measuring device on the one hand, and the motion of the machine tool. The control mechanism that is provided for this purpose can either remove the working tool away from the working piece, or turn off the entire machine.

There are possible, of course, many convenient combinations of the device according to this invention with conventional controlling or regulating systems. For this reason it is particularly advantageous to apply the present invention for the automation of such machining operations that hitherto could not be effected because of the extraordinary serious damage which might result from the failure of the feeler of the measuring equipment.

BRIEF DESCRIPTION OF THE DRAWING

The invention will now be illustrated by way of an example in the accompanying drawing which forms part of the application and in which the single FIGURE is a schematic diagram of the capacitive distance measuring device embodying this invention.

DETAILED DESCRIPTION

Referring now to the drawing, a flat working piece surface 1 of electroconductive material is capacitively sensed by a feeling electrode 2 which is mechanically mounted on any suitable support (not shown). The working piece surface 1 and the spaced feeling electrode 2 form thus a measuring condenser 3 the variable capacity of which is proportional to the distance of the working piece surface 1 from the electrode 2.

The measuring condenser 3 is connected in series with an inductance or coil 5 to form a series tank circuit therewith. This series tank circuit 3,5 is coupled to the input of an oscillator 6 to determine the measuring frequency at the output of the oscillator 6. In this manner, the oscillator 6 transforms, within a predetermined operative range thereof, the distance changes into corresponding frequency changes. The frequency modulated signals are subsequently amplified in a frequency selective amplifier and converted into final output signals. For the measuring frequency, the frequency selective amplifier 7 is adjusted to amplify the range of frequencies which corresponds to the range of the predetermined distance measurement. The amplified measuring signal is converted in a discriminator 8 into an amplitude modulated signal which is picked up at the output 9. The amplitude of this signal is indicative of the actual distance.

According to this invention, a blocking condenser 4 is connected in series between the series tank circuit 3,5 and the input of the oscillator 6. The capacitive resistance of the condenser 4 is adjusted such as to be negligible with regard to the capacitance of the measuring condenser 3 (i.e., of the feeling electrode 2 and the working piece surface 1) at normal operative conditions. Consequently, at the normal operation, the condenser 4 has the minimum influence on the frequency of the series tank circuit 3,5 of the oscillator 6. On the other hand, the condenser 4 blocks the input of the oscillator 6 against the direct current that otherwise might reach and damage the oscillator 6 when a short circuit in the measuring condenser 3 takes place.

As mentioned above, the output frequency of the oscillator 6 is a function of the distance variations between the feeling electrode 2 and the working piece surface 1. If a short circuit between the electrode 2 and surface 1 happens such as, for instance, a short circuit as caused by metal drillings or turnings, there will result a galvanic connection in the measuring condenser 3. Nevertheless, due to the blocking condenser 4 and the large capacity thereof, the tank circuit will still generate oscillations defined by the coil 5 and this condenser 4. As a result, the output signal at the oscillator 6 will have a substantially lower frequency than the measuring signal that will not be processed in the measuring amplifier 7.

To employ this low frequency, another selective amplifier 10 is connected parallel to the measuring amplifier 7 and is pretuned for the warning, low frequency signal only. After the amplification in the amplifier 10, the low frequency signal is rectified in a rectifier 11 and applied to the input of a triggering and switching amplifier 12 which passes at the output 13 thereof an electrical control output signal. This control output signal can be subsequently employed for the actuation of any suitable warning or automatically controlling device, either electrical or non-electrical such as optical or acoustical warning systems, for example.

When the control output signal is employed in servosystems in which control members (not shown) for the automatic vertical adjustment of the feeling electrode 2 are provided, the capacitive distance measuring device of this invention may be operatively coupled with these control members to raise the feeling electrode 2 when the "upwards" control output signal is generated. At the same time, the control of the machine tool may be activated to stop the transverse of the machining tool or to automatically disengage the same in order to prevent the working piece from damage.

In another modification of this invention, the transducer for transforming the distance variations into corresponding variations of an electric signal can be made in the form of a capacitance bridge that has in one branch thereof the series connection of the measuring condenser 3, blocking condenser 4 and the coil 5. In another branch of this bridge, a suitable voltage divider is arranged in such a manner as to enable a direct determination of the measuring or of the controlling output signal.

To persons skilled in the art it is evident that this invention offers various possibilities how to effectively combine the capacitive distance measuring device with conventional regulating or controlling systems to provide an increased operational safety and economy.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A device for the capacitive measurement of a distance between an electrode and an electrically conductive surface, comprising, in combination
    said electrode being a feeling capacitor electrode spaced from said conductive surface for said distance;
    a capacity-to-signal transducer means coupled to said feeling electrode and said conductive surface to produce a signal proportional to said distance within a predetermined range of measurement; and
    electric coupling means coupled between said feeling electrode and said transducer means to produce a second signal that is outside of said range of measurement when a short circuit occurs between said feeling electrode and said conductive surface.

2. The device according to claim 1 further comprising measuring indicator means actuated by said proportional signal, and a warning device actuated by said second signal.

3. The device according to claim 2 wherein said capacity-to-signal transducer means is an electric oscillator operatively coupled with a series tank circuit, the variable capacity of said tank circuit being formed by the capacity between said feeling electrode and said conductive surface; and said electric coupling means being a capacitor having a substantially greater capacity than said variable capacity to produce, during said short circuit, a signal having a frequency that is substantially lower than the frequency range for the distance measurement.

4. The device according to claim 3 wherein said warning device comprises a selective amplifier means amplifying the frequency of said second signal only.

5. The device according to claim 2 wherein said warning device releases a non-electrical warning signal.

6. The device according to claim 1 further comprising control means actuated by said second signal for removing said short circuit between said feeling electrode and said conductive surface.

* * * * *